No. 615,669. Patented Dec. 13, 1898.
I. F. & F. C. BEERS.
THERMOSTAT.
(Application filed Apr. 5, 1897.)
(No Model.) 2 Sheets—Sheet 1.
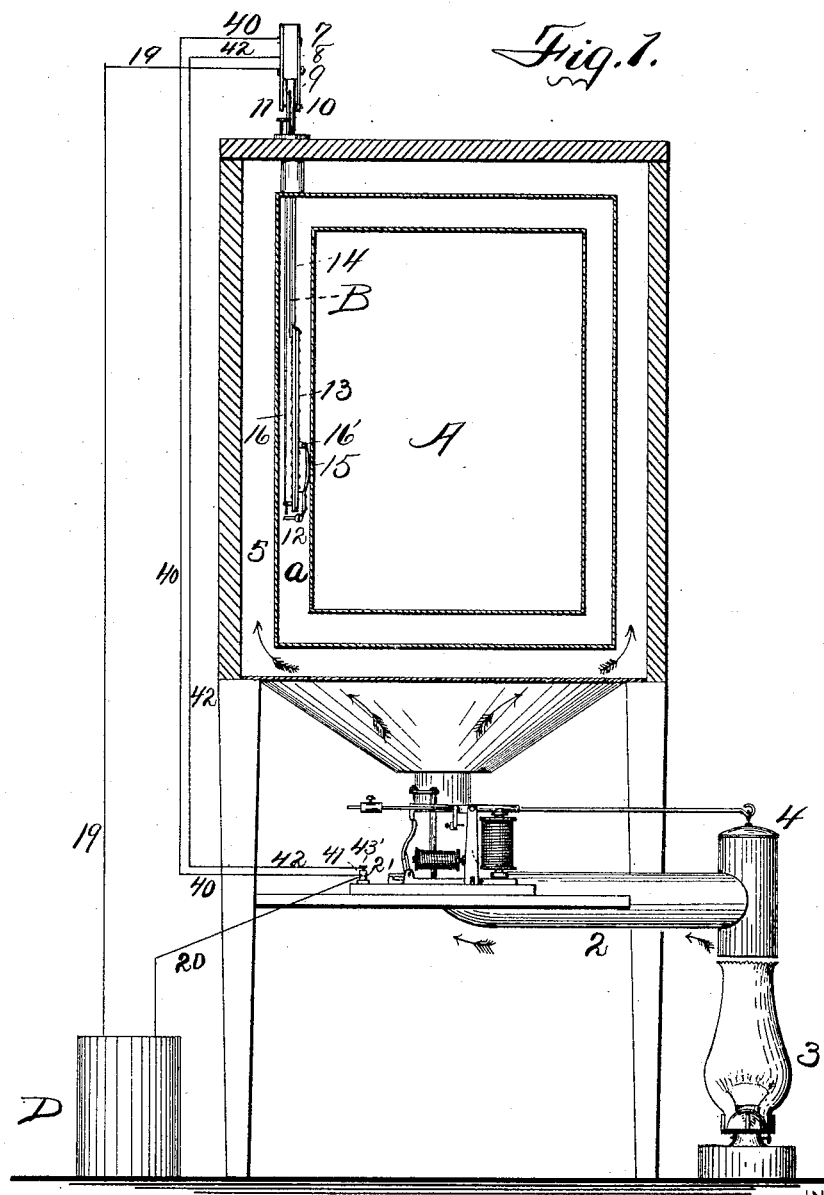
WITNESSES:
Charles W. Marvin.
Mary A. Franklin.
INVENTORS
Ira F. Beers.
Frederic C. Beers.
BY
Smith & Emison
ATTORNEYS.

No. 615,669. Patented Dec. 13, 1898.
I. F. & F. C. BEERS.
THERMOSTAT.
(Application filed Apr. 5, 1897.)
(No Model.) 2 Sheets—Sheet 2.
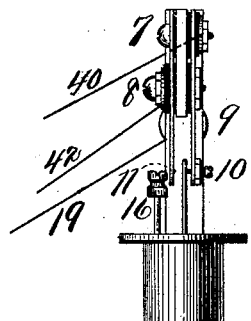
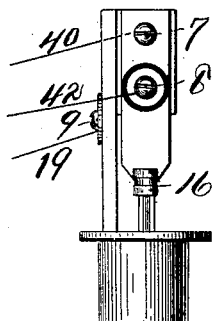
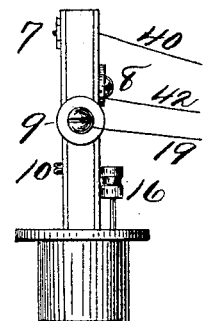
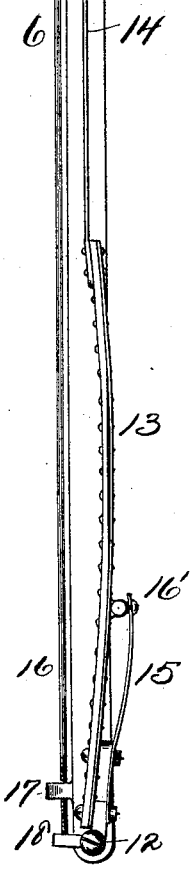
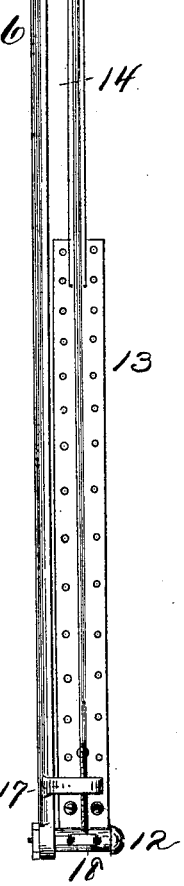
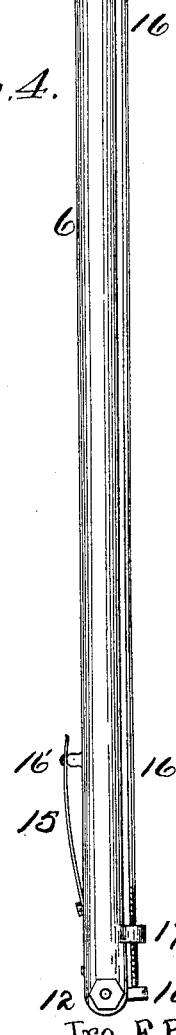
Fig. 3. Fig. 2. Fig. 4.
WITNESSES:
Charles W. Morvin
Mary A. Franklin
INVENTORS
Ira F. Beers.
Frederic C. Beers.
BY
Smith & Dembow
ATTORNEYS.

United States Patent Office.

IRA F. BEERS AND FREDERIC C. BEERS, OF ROCHESTER, NEW YORK.

THERMOSTAT.

SPECIFICATION forming part of Letters Patent No. 615,669, dated December 13, 1898.

Application filed April 5, 1897. Serial No. 630,677. (No model.)

*To all whom it may concern:*

Be it known that we, IRA F. BEERS and FREDERIC C. BEERS, of Rochester, in the county of Monroe, in the State of New York, have invented new and useful Improvements in Thermostats, of which the following, taken in connection with the accompanying drawings, is a full, clear, and exact description.

Our invention relates to an improvement in thermostats; and it consists in the combination and arrangement of parts, which will be more fully described hereinafter.

The object of our invention is to provide a thermostat which opens and closes an electric circuit for the purpose of opening or closing a valve by means of which the heat is made to pass through or into the chamber which is to be heated and by means of which thermostat and the electric mechanism connected thereto the heat can be controlled with absolute precision.

It is constructed as follows, reference being had to the accompanying drawings, in which—

Figure 1 is a sectional elevation of a heater, a chamber to be heated, a thermostat to regulate its temperature, a battery connected to it, and a damper-operating mechanism connected to the thermostat. Fig. 2 is a side elevation of the thermostat detached. Fig. 3 is a front elevation thereof. Fig. 4 is a rear elevation thereof.

A is a suitable chamber inclosed by suitable walls upon suitable supports, the chamber here shown being one of the incubating type, to which hot air is supplied through a pipe 2 from a heater 3, 4 being a damper by which the quantity of hot air is varied and regulated in its supply, according to the position of the damper with relation to its seat.

B is a thermostat, shown as suspended in a chamber *a*, intermediate to the incubating-chamber and the chamber 5, which receives the hot air direct from the heater, said chamber *a* being employed to prevent any sudden cooling or chilling of the main chamber thus inclosed within it. This thermostat comprises a suitable body 6, provided with a suitable binding-post 9.

7 8 are binding-posts or poles mounted thereon with suitable insulation and further provided with contact-points 10 11, opposite each other, one at least of which is adjustable, as by a screw, to vary its inward projection.

Upon a suitable pintle 12 a combined thermostatic bar 13 and armature 14 in extension thereof is suitably pivoted or hinged, and 15 is a suitable spring secured to a lug 16' on said body and arranged to exert a constant pull upon the thermostatic bar, so as to force the armature, when left free to move, toward the contact-point 10, as against the pressure of the screw upon the ear 18. This bar consists of two pieces of suitable material, as rubber and brass, of different degrees of expansion, suitably secured together, all being such that when the temperature rises to a fixed point said armature will make contact with the point 10 and when it falls to a fixed point it will make contact with the point 11.

A screw 16 through a lug 17 on said body engages with an ear 18 upon the hinge-leaf, whereby said armature can be swung and laterally adjusted with reference to said contacts, and by varying the distance between them the swing of the armature is varied, and this varies the degree of temperature necessary to make contact with either point.

D is a suitable battery, having one pole connected by a wire 19 to the binding-post 9 and having the other connected by a wire 20 to a binding-post 21 and thence suitably connected by insulated wiring to the frame of the electric regulator, which is used in connection herewith for controlling the damper, as shown in Fig. 1, but which damper-controlling mechanism forms no special part of this invention. The wires 40 42 are shown connecting the thermostat with the regulator, which, although shown in this connection, forms no necessary part of our invention in this application.

Having described our invention, what we claim, and desire to secure by Letters Patent, is—

In a thermostat, the body provided with a suitable binding-post 9, binding-posts 7 and 8 mounted thereon, and insulated from the body and provided with contact-points 10 and 11, one of which contact-points is made adjustable; combined with a pintle 12 upon the lower end of the body, a thermostatic bar 13 mounted upon the pintle, an extension 14 of the thermostatic bar extending up between the two contact-points, a spring secured to a lug upon the body and which spring has its lower end arranged to exert a pull upon the pintle, and a regulating-screw 16 which has its lower end to bear against the pintle upon the opposite side from the spring, substantially as shown.

In witness whereof we have hereunto set our hands this 31st day of March, 1897.

IRA F. BEERS.
   FREDERIC C. BEERS.

In presence of—
 IRA S. BEERS,
 MARY F. BEERS.